(12) United States Patent
Cho

(10) Patent No.: US 9,318,146 B2
(45) Date of Patent: Apr. 19, 2016

(54) METHOD AND APPARATUS FOR WRITING AND USING SERVO CORRECTION DATA

(75) Inventor: Hyung Joon Cho, Suwon-si (KR)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 26 days.

(21) Appl. No.: 13/459,019

(22) Filed: Apr. 27, 2012

(65) Prior Publication Data

US 2013/0027806 A1    Jan. 31, 2013

(30) Foreign Application Priority Data

Apr. 27, 2011    (KR) .................. 10-2011-0039710

(51) Int. Cl.
   G11B 5/02     (2006.01)
   G11B 20/10    (2006.01)
   G11B 5/596    (2006.01)

(52) U.S. Cl.
   CPC .......... *G11B 20/10009* (2013.01); *G11B 5/596* (2013.01); *G11B 5/59655* (2013.01)

(58) Field of Classification Search
   None
   See application file for complete search history.

(56) References Cited

U.S. PATENT DOCUMENTS

| | | | |
|---|---|---|---|
| 6,185,063 B1 * | 2/2001 | Cameron ................ | 360/78.04 |
| 6,493,173 B1 * | 12/2002 | Kim et al. ................ | 360/77.04 |
| 6,549,360 B1 * | 4/2003 | Xuan et al. ............... | 360/72.1 |
| 7,333,287 B2 * | 2/2008 | Hara ....................... | 360/77.02 |
| 7,440,221 B2 | 10/2008 | Tsuchinaga | |
| 7,982,994 B1 | 7/2011 | Erden | |
| 8,179,627 B2 | 5/2012 | Chang | |
| 8,270,256 B1 | 9/2012 | Juang | |
| 2003/0112539 A1 * | 6/2003 | Shu ......................... | 360/48 |
| 2004/0021977 A1 * | 2/2004 | Lim et al. .................. | 360/77.04 |
| 2005/0190480 A1 * | 9/2005 | Mori et al. ................. | 360/60 |
| 2007/0030588 A1 | 2/2007 | Tsuchinaga | |
| 2008/0239554 A1 * | 10/2008 | Takeda et al. .............. | 360/77.02 |
| 2011/0085266 A1 | 4/2011 | Kanai | |
| 2011/0141599 A1 * | 6/2011 | Yasuna et al. .............. | 360/31 |
| 2011/0222186 A1 | 9/2011 | Itakura | |
| 2011/0292545 A1 | 12/2011 | Katada | |
| 2012/0060073 A1 | 3/2012 | Itakura | |
| 2012/0069466 A1 | 3/2012 | Okamoto | |
| 2012/0082019 A1 | 4/2012 | Harigae | |
| 2012/0099216 A1 | 4/2012 | Grobis | |
| 2012/0162808 A1 | 6/2012 | Masuda | |
| 2012/0194937 A1 | 8/2012 | Tagami | |
| 2013/0342929 A1 * | 12/2013 | Coker et al. ............... | 360/31 |

OTHER PUBLICATIONS

Garth Gibson, Directions for Shingled-Write and Two-Dimensional Magnetic Recording System Architectures: Synergies with Solid-State Disks, Carnegie Mellon University, May 2009, pp. 1-2, Pittsburgh, US.

* cited by examiner

*Primary Examiner* — Wayne Young
*Assistant Examiner* — Mark Fischer
(74) *Attorney, Agent, or Firm* — Braden Katterheinrich

(57) ABSTRACT

Methods and apparatuses for generating and using servo correction data are disclosed. In one embodiment, an apparatus may comprise a data storage medium having a first track and a second track, servo correction data for the first track and the second track stored on the first track, and no servo correction data stored on the second track, and a controller configured to correct servo errors based on the servo correction data. In another embodiment a method may comprise receiving servo information related to a first data storage medium having a first track and a second track, generating one or more position error signals (PES) based on the servo information, generating servo correction data based on the one or more PES, and storing the servo correction data for the first track and the second track on the first track.

20 Claims, 18 Drawing Sheets

METHOD AND APPARATUS FOR WRITING AND USING SERVO CORRECTION DATA

CROSS-REFERENCE TO RELATED APPLICATIONS

This application claims priority under 35 U.S.C. §119(a) of Korean Patent Application No. 2011-0039710, filed on Apr. 27, 2011, the entire disclosure of which is hereby incorporated by reference.

BACKGROUND OF THE INVENTION

1. Field of the Invention

The present disclosure relates to a storage medium and a storage device thereof, and particularly, to a storage medium having servo correction data written thereon, and a storage device using the same.

2. Background of the Invention

A storage device connectable to a host device can write data to a storage medium or read data from the storage medium, in response to a command received from the host device.

As the storage medium has increased storage capacity and recording density, a data write technique for reducing track pitch for enhanced recording density is being researched. In accordance with this, a technique for writing servo correction data in a storage medium having a reduced track pitch is also being researched.

SUMMARY OF THE INVENTION

In one embodiment, an apparatus may comprise a data storage medium having a first track and a second track, servo correction data for the first track and the second track stored on the first track, and no servo correction data stored on the second track, and a controller configured to correct servo errors based on the servo correction data.

In another embodiment, a method may comprise storing servo correction data for a first track and a second track of a first data storage medium on the first track, and not storing servo correction data on the second track, and correcting servo errors based on the servo correction data.

In another embodiment a method may comprise receiving servo information related to a first data storage medium having a first track and a second track, generating one or more position error signals (PES) based on the servo information, generating servo correction data based on the one or more PES, and storing the servo correction data for the first track and the second track on the first track.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Therefore, an aspect of the detailed description is to provide a storage medium having servo correction data written thereon with increased storage capacity and recording density, for prevention of data erase due to writing on a neighboring track. Another aspect of the detailed description is to provide a storage device capable of writing servo correction data with increased storage capacity and recording density of a storage medium, and capable of correcting a servo error signal using servo correction data read from the storage medium during a data read operation or a data write operation. Accordingly there is provided the storage medium having servo correction data written thereon so as to prevent data erase due to writing on a neighboring track, in the storage medium having a reduced track pitch with increased storage capacity and recording density. Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1A:
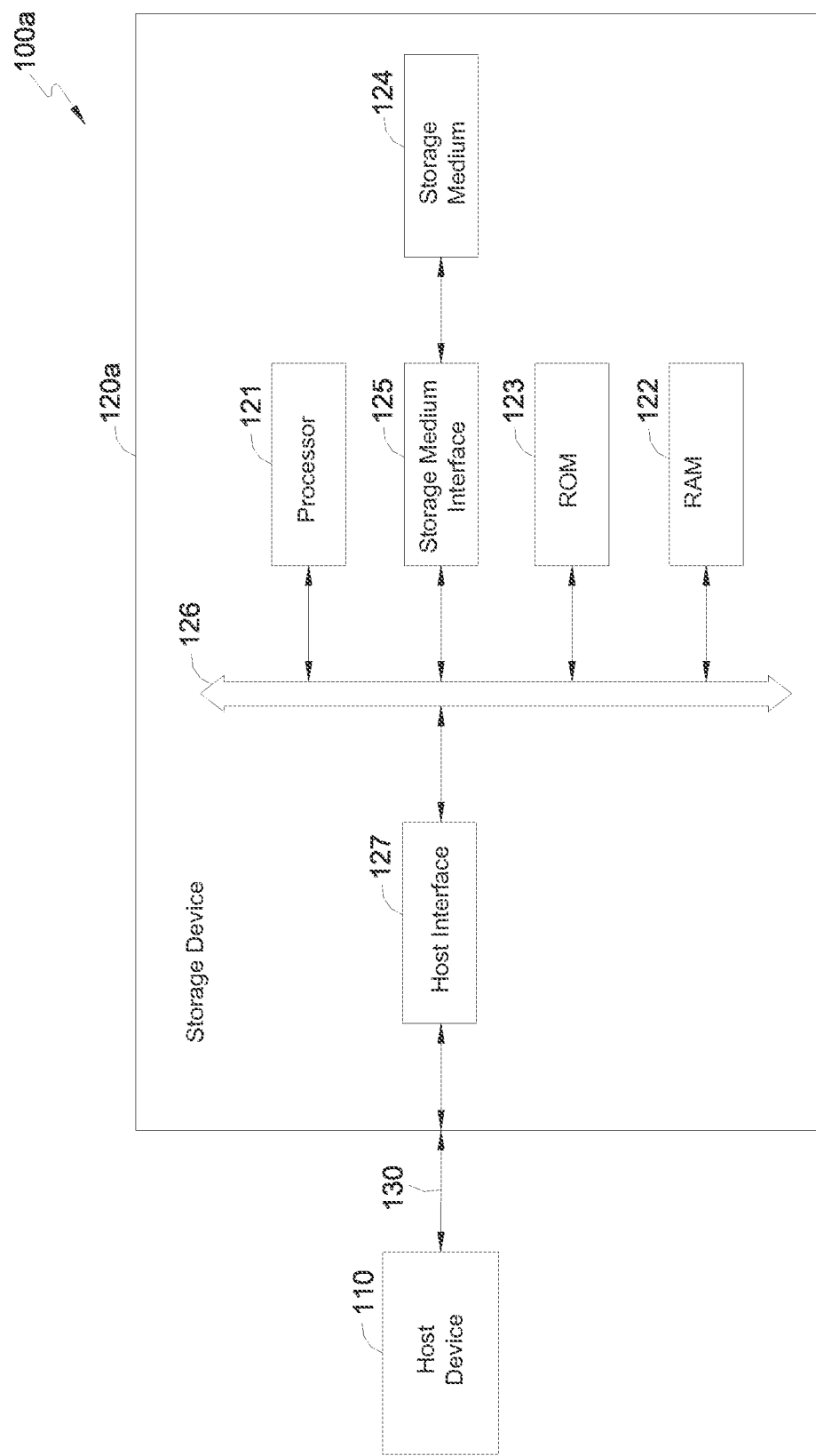
FIG. 1A is a function block diagram of a host device/storage device-based system according to an embodiment of the present invention.

FIG. 1A is a function block diagram of a host device/storage device-based system 100a according to an embodiment of the present invention. The host device/storage device-based system 100a may be referred to as a computer system. However, the present invention is not limited to this.

Referring to FIG. 1A, the host device/storage device-based system 100a includes a host device 110, a storage device 120a and a communication link 130.

The host device 110 may generate a command for operating the storage device 120a, and transmit the generated command to the storage device 120a connected thereto via the communication link 130. And, the host device 110 may perform an operation or a process for transmitting data to the storage device 120a in response to the generated command, or for receiving data from the storage device 120a.

The host device 110 may be a device, a server, a digital camera, a digital media player, a set-top box, a processor, a filed programmable gate array, a programmable logic device, and/or a suitable electronic device each operated according to Microsoft Windows Operating System programs. The host device 110 may be integrated with the storage device 120a. The communication link 130 may be configured to connect the host device 110 and the storage device 120a to each other via a wire communication link or a wireless communication link.

If the host device 110 and the storage device 120a are connected to each other via a wire communication link, the communication link 130 may be implemented as a connector for electrically connecting an interface port of the host device 110 and an interface port of the storage device 120a. The connector may include a data connector and a power connector. As an example, if the host device 110 and the storage device 120a are connected to each other via a Serial Advanced Technology Attachment (SATA) interface, the connector may include a 7-pin SATA data connector, and a 15-pin SATA power connector.

On the other hand, if the host device 110 and the storage device 120a are connected to each other via a wireless communication link, the communication link 130 may be implemented as a wireless communication such as Bluetooth or Zigbee. The storage device 120a may write data received from the host device 110 on a storage medium 124, or may transmit data read from the storage medium 124 to the host device 110 in response to a command received from the host device 110. The storage device 120a may be referred to as a data storage device, or a disk drive, or a disk system, or a memory device. If the storage medium 124 writes data by a shingled write operation to be later explained, the storage device 120a may be referred to as a shingled write disk system, or a shingled magnetic recording.

Referring to FIG. 1A, the storage device 120a includes a processor 121, a Random Access Memory (RAM) 122, a Read Only Memory (ROM) 123, a storage medium 124, a storage medium interface 125, a bus 126 and a host interface 127. However, the present invention is not limited to this. That is, the number of components of the storage device 120a may be greater or less than that of the components shown in FIG. 1A. For instance, the processor 121, the RAM 122 and the host interface 127 may be implemented as a controller.

The processor 121 is configured to analyze a command received from the host device 110 via the host interface 127 and the bus 126, and to control the components of the storage device 120a based on an analyzed result. The processor 121 may include a code object management unit, and may load code objects stored in the storage medium 124 to the RAM 122 using the code object management unit. For instance, the processor 121 may load code objects stored in the storage medium 124 to the RAM 122, the code objects for executing a servo correction data writing method of FIG. 11 and a servo error signal correcting method of FIG. 12 to be later explained.

Figure 11:
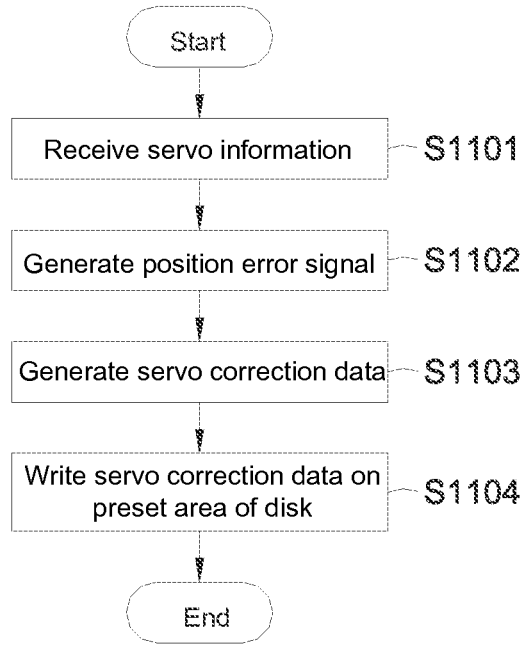
FIG. 11 is a flowchart showing an operation for writing servo correction data according to an embodiment of the present invention.
Figure 12:
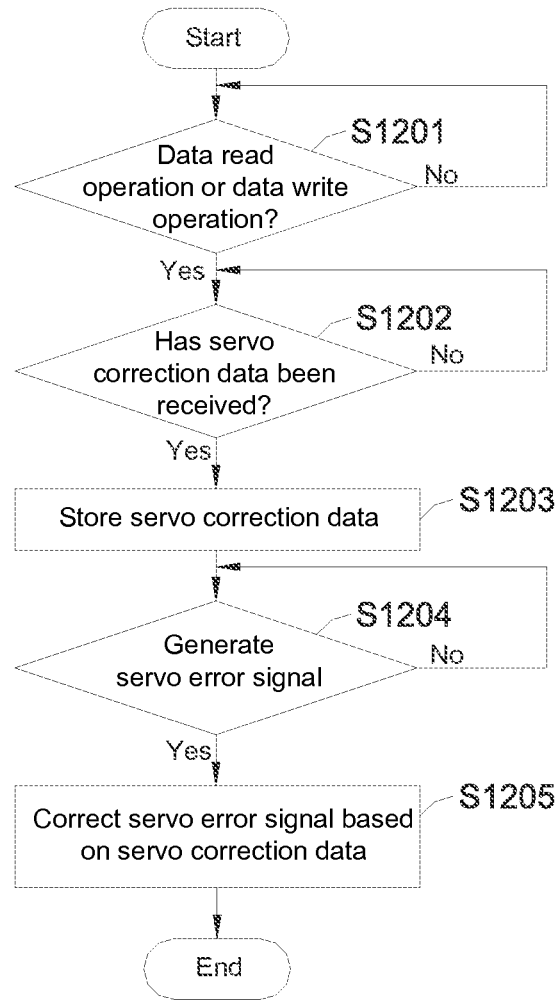
FIG. 12 is a flowchart showing an operation for correcting a servo error signal according to an embodiment of the present invention.

The processor 121 may execute tasks using the code objects loaded to the RAM 122, the tasks with respect to the servo correction data writing method of FIG. 11 and the servo error signal correcting method of FIG. 12. The servo correction data writing method executed by the processor 121 will be explained in more details with reference to FIG. 11, and the servo error signal correcting method executed by the processor 121 will be explained in more details with reference to FIG. 12.

Program codes and data required to operate the storage device 120a may be stored in the ROM 123. The. The program codes and data stored in the ROM 123 may be loaded to the RAM 122 under control of the processor 121. The data stored in the ROM 123 and loaded to the RAM 122 may include information regarding a write position of servo correction data to be written on the storage medium 124 to be later explained in FIGS. 9A to 9G, and may include the number of data tracks in a servo frame section to be later explained, and the number of servo sectors included in a servo information area.

Figure 2:
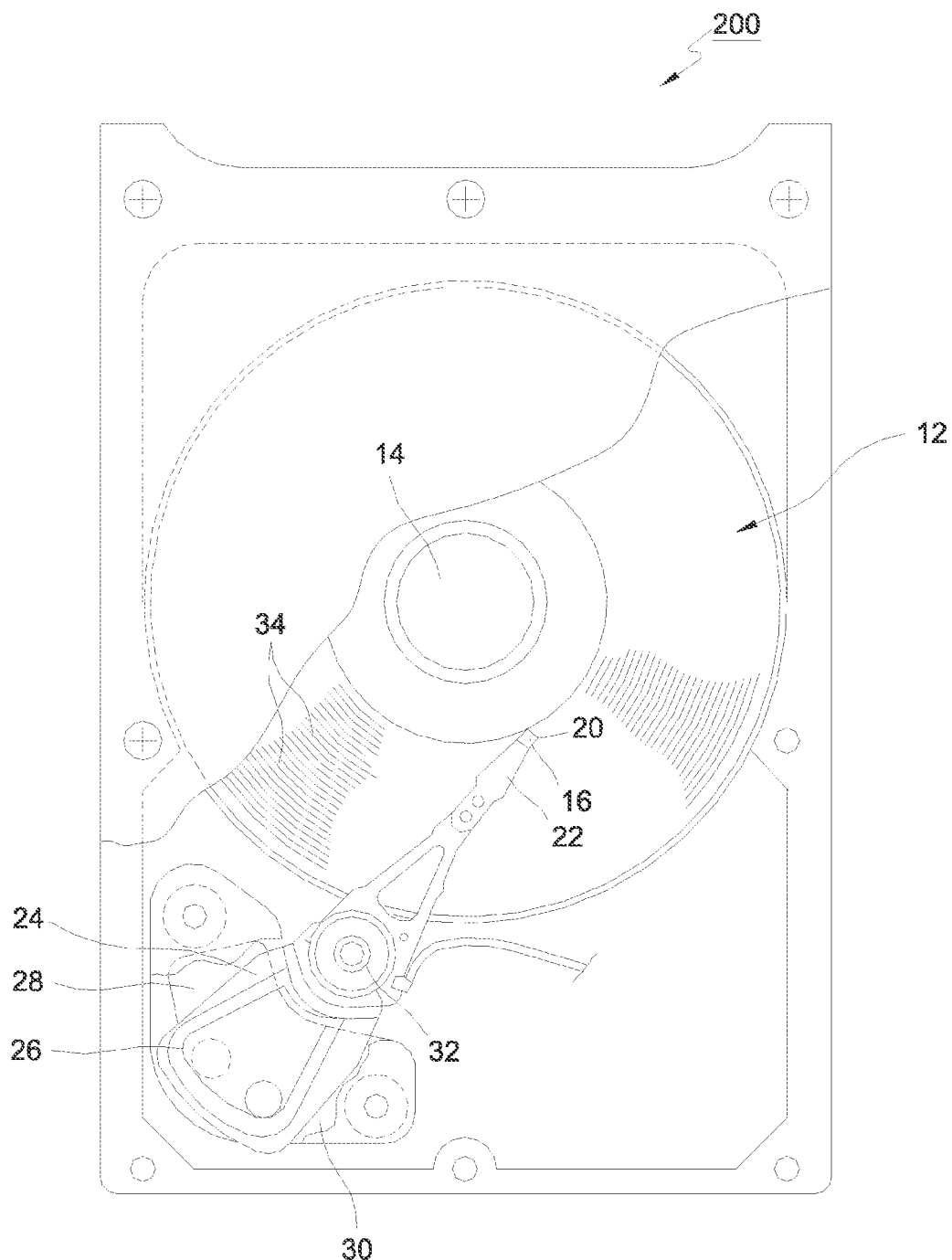
FIG. 2 is a planar view of a head disk assembly in a case where a storage device of FIG. 1A is a disk drive.

FIG. 2 is a planar view of a head disk assembly 200 in a case where the storage device 120a of FIG. 1A is a disk drive. Referring to FIG. 2, the head disk assembly 200 includes at least one disk 12 rotated by a spindle motor 14. It should be interpreted that the disk 12 corresponds to the storage device 120a of FIG. 1A. The head disk assembly 200 includes a head 16 positioned close to the surface of the disk 12.

The head 16 may read data or write data from/onto the disk 12 being rotated, by sensing a magnetic field of each disk 12 and magnetizing the disk 12. Generally, the head 16 is coupled to the surface of each disk 12. Even if a single head 16 is shown in FIG. 2, it should be understood that the single head 16 is composed of a recording head for magnetizing the disk 12 and a reading head for detecting a magnetic field of the disk 12. The reading head may be implemented from a magneto-resistive (MR) device. The head 16 may be called 'magnetic head' or 'transducer'.

The head 16 may be integrated with a slider 20. The slider 20 has a structure to generate air bearing between the head 16 and the surface of the disk 12. The slider 20 is coupled to a head gimbal assembly 22. The head gimbal assembly 22 is attached to an actuator arm 24 having a voice coil 26. The voice coil 26 is positioned close to a magnetic assembly 28 so as to define a voice coil motor (VCM) 30. Current supplied to the voice coil 26 generates torque for rotating the actuator arm 24, with respect to a bearing assembly 32. The rotation of the actuator arm 24 moves the head 16 across the surface of the disk 12. Generally, data is written on a plurality of annular tracks 34 of the disk 12.

The disk 12 may be divided into a maintenance cylinder area not allowing a user's access, and a user data area allowing a user's access. The maintenance cylinder area may be referred as a system area. All types of information required to control the disk drive is stored in the maintenance cylinder area. For instance, the maintenance cylinder area may be set as an Outer Diameter (OD) area or an Inner Diameter (ID) area of the disk 12.

In the maintenance cylinder area, may be stored information required to execute a servo correction data writing method and a servo error signal correcting method according to preferred embodiments of the present invention. The information required to execute a servo correction data writing method may include information regarding a write position of servo correction data to be explained in more details with reference to FIGS. 9A to 9G. The servo correction data should be written on a position where data erase due to a write operation on a neighboring track does not occur. Accordingly, the position on which servo correction data is written in the preferred embodiments of the present invention, may be referred to as a specific position where erase of servo correction data due to a write operation on a neighboring track does not occur.

Servo correction data of each track may be stored in the maintenance cylinder area. The servo correction data of each track may be stored in the maintenance cylinder area in units of servo frames or bands to be explained in more details with reference to FIG. 5. If servo correction data of each track is stored in the maintenance cylinder area, the processor 121 may load the stored servo correction data to the RAM 122 and may read the data when necessary. The servo correction data is necessary when tracking a corresponding data track in a servo frame section. More specifically, the servo correction data is necessary when correcting a servo error signal such as Position Error Signal (PES) generated when tracking a corresponding data track.

The head 16 moves across the surface of the disk 12 so as to read or write data from/onto another track. A plurality of code objects for implementing various functions of the disk drive may be stored in the disk 12. As an example, a code object for performing an MP3 player function, a code object for performing a navigation function, a code object for performing various video games, etc. may be stored in the disk 12.

Referring to FIG. 1A, the storage medium interface 125 is configured to allow the processor to write data or read data by accessing the storage medium 124. If the storage device 120a is implemented as a disk drive, the storage medium interface 125 may include a servo circuit to control the head disk assembly 200 and a read/write channel to perform signal processing for reading and/or writing data.

During a data read operation or a data write operation, the storage medium interface 125 may transmit servo correction data read from the storage medium 124 via the head 16 to the processor 121. The servo correction data read from the storage medium 124 may be pre-written on a position shown in FIGS. 9A to 9G to be later explained, or may be pre-stored in the maintenance cylinder area of the storage medium 124. The processor 121 may temporarily store the received servo correction data therein or in the RAM 122 for later use.

The host interface 127 of FIG. 1A may perform data transmission and/or reception between the host device 110 and the storage device 120a. And, the host interface 127 may be configured based on the communication link 130. The bus 126 may be configured to transmit information between the components of the storage device 120a.

Figure 3:
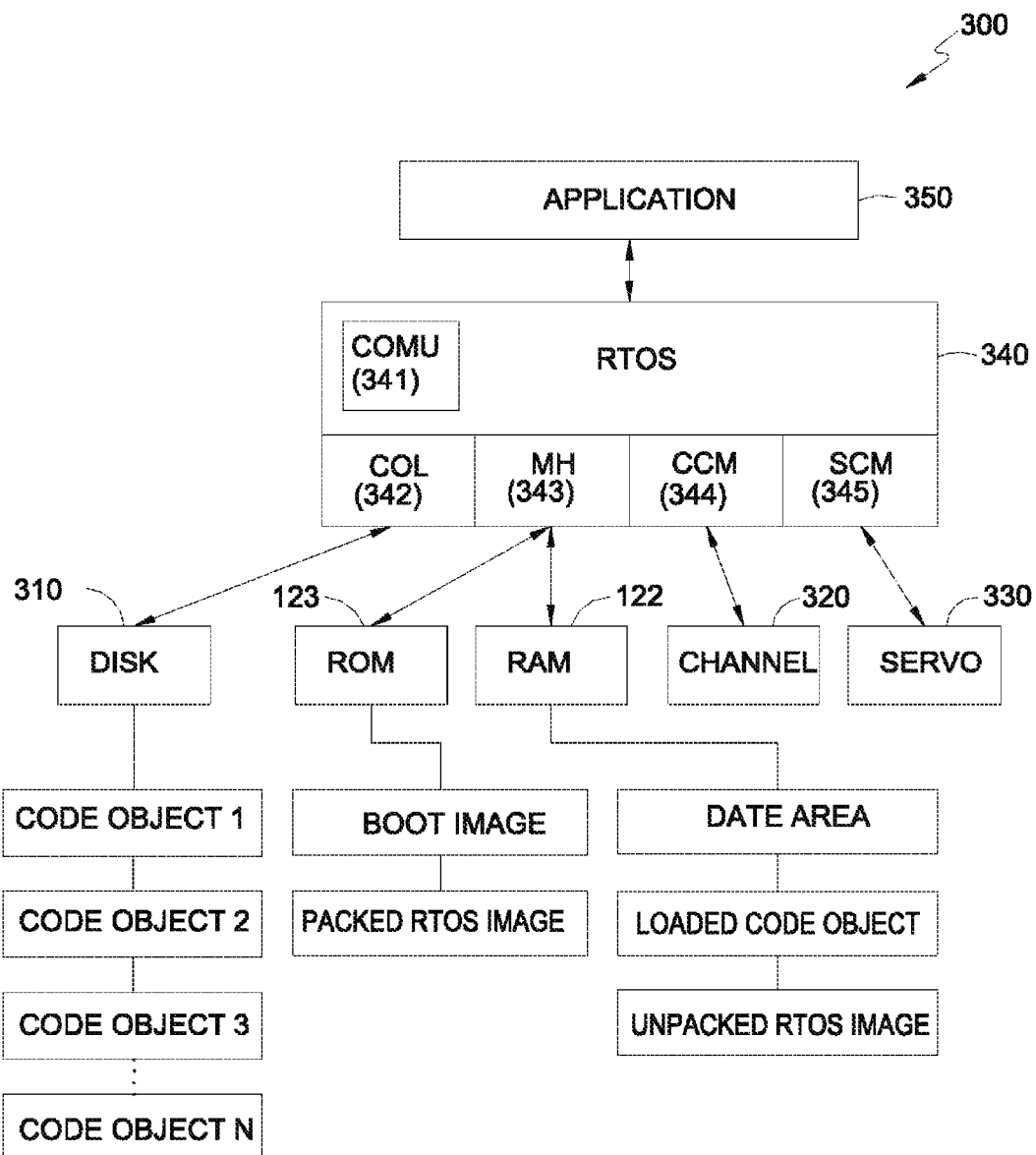
FIG. 3 is a view for explaining a software operating system in a case where a storage device of FIG. 1A is a disk drive.

If the storage device 120a is implemented as a disk drive, a software operating system of the storage device 120a may be defined as a system shown in FIG. 3

FIG. 3 is a view for explaining a software operating system in a case where the storage device 120a of FIG. 1A is a disk drive.

Referring to FIG. 3, a plurality of code objects 1~N are stored in a disk 310 corresponding to the storage device 124 of FIG. 1A. Code objects written on the disk 310 may include not only code objects required to operate the disk drive, but also code objects associated with various functions using the disk drive.

Code objects for executing the servo correction data writing method of FIG. 11 and the servo error signal correcting method of FIG. 12 may be stored in the disk 310. Alternatively, the code objects for executing the servo correction data writing method of FIG. 11 and the servo error signal correcting method of FIG. 12 may be stored in the ROM 123, rather than in the disk 310. Code objects for performing various functions such as an MP3 player function, a navigation function and a video game may be stored in the disk 310.

In the ROM 123, boot images and packed RTOS images are stored. Unpacked RTOS images compression-released by reading the boot images from the ROM 123 during a booting process are loaded to the RAM 122. Code objects required to drive the host interface stored in the disk 310 are loaded to the RAM 122. A data area for storing data is allocated to the RAM 122.

A channel circuit 320 has therein circuitry required to perform signal processing for reading/writing data. A servo circuit 330 has therein circuitry required to control a head disk assembly 200 for reading/writing data.

A Real Time Operating System (RTOS) 340 is a real-time operating system program, which is a multiple-program operating system using the disk 310. The RTOS 340 performs real-time multiple processing at a foreground having a high priority, and performs integrated processing at a background having a low priority per task. And, the RTOS 340 may load code objects from the disk 310, and unload code objects to the disk 310.

The RTOS 340 manages a Code Object Management Unit (COMU) 341, a Code Object Loader (COL) 342, a Memory Handler (MH) 343, a Channel Control Module (CCM) 344, and a Servo Control Module (SCM) 345, thereby executing a task corresponding to a requested command. The RTOS 340 further manages an application program 350.

The RTOS 340 loads code objects required to control the disk drive to the RAM 122 during a booting process of the disk drive. Therefore, once the booting process is executed, the disk 310 can be operated by using the code objects loaded to the RAM 122. If the disk 310 is a shingled write disk, the RTOS 340 may be operated based on an HDD Translation Layer (HTL) to be later explained in FIGS. 5, 6A and 6B.

The COMU 341 is configured to store therein information regarding positions where the code objects have been recorded, and to perform arbitrate the bus 126. Information regarding priorities of tasks being executed is also stored in the COMU 341. And, the COMU 341 is configured to manage Task Control Block (TCB) information and stack information required to perform tasks corresponding to code objects.

The COL 342 is configured to load code objects stored in the disk 310 to the RAM 122, or is configured to unload code objects stored in the RAM 122 to the disk 310 using the COMU 341. Therefore, the COL 342 can load the code objects stored in the disk 310 to the RAM 122, the code objects for executing the servo correction data writing method of FIG. 11 and the servo error signal correcting method of FIG. 12.

The RTOS 340 may execute the servo correction data writing method of FIG. 11 and the servo error signal correcting method of FIG. 12 to be later explained, using the code objects loaded to the RAM 122.

The MH 343 reads or writes data from/onto the ROM 123 and the RAM 122. The CCM 344 controls channels required to perform signal processing for reading/writing data. And, the SCM 345 may control servo including the head disk assembly 200, so as to execute a servo correction data write operation and a data read operation or a data write operation according to preferred embodiments of the present invention.

Figure 1B:
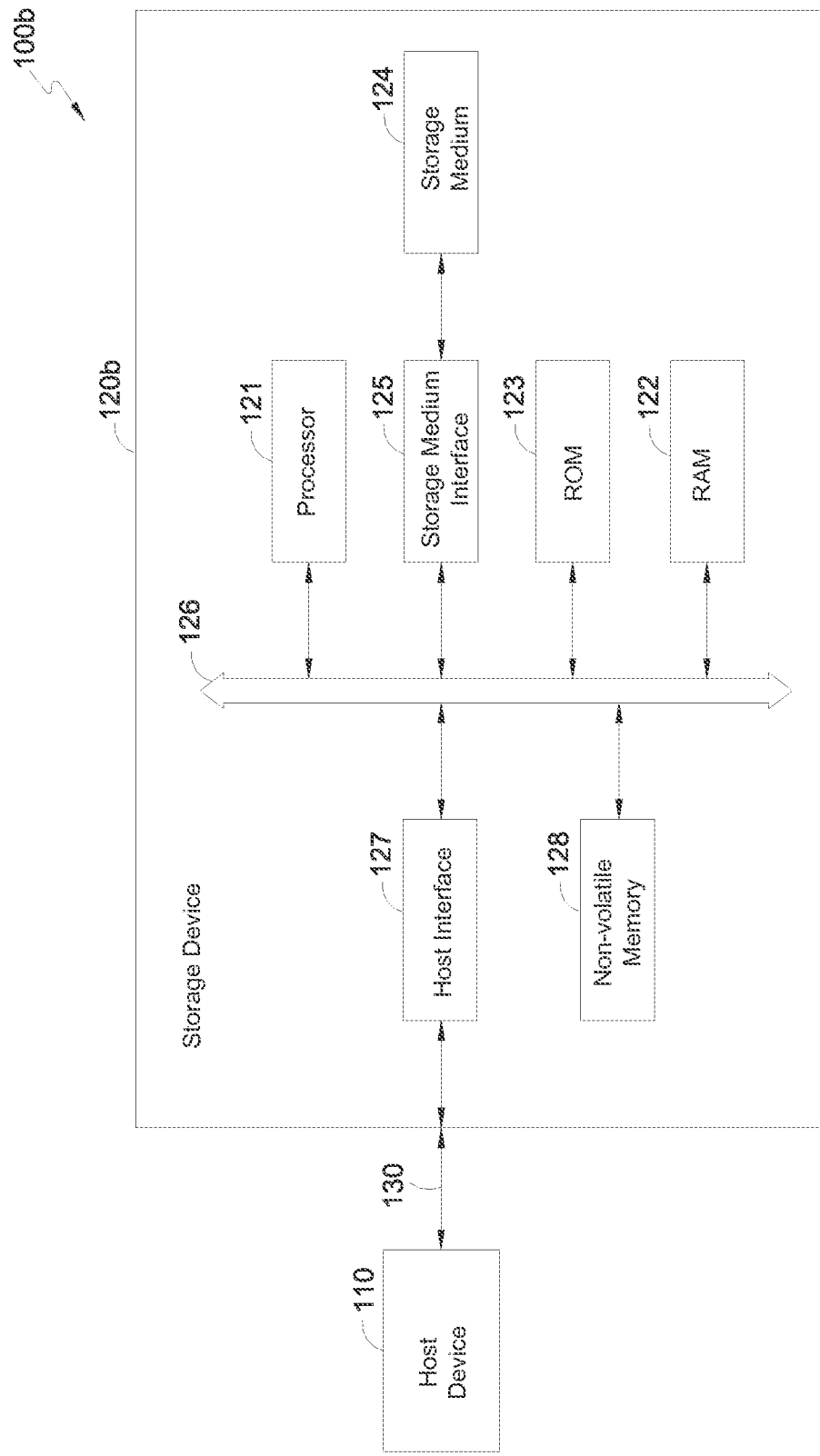
FIG. 1B is a function block diagram of a host device/storage device-based system according to another embodiment of the present invention.

FIG. 1B is a function block diagram of a host device/storage device-based system 100b according to another embodiment of the present disclosure.

Referring to FIG. 1B, a storage device 120b of FIG. 1B further comprises a non-volatile memory device 128, in addition to the components of the storage device 120a of FIG. 1A. A storage medium 124 of FIG. 1B may be implemented as a disk.

The non-volatile memory device 128 may be implemented as a non-volatile semiconductor memory device. As an example, the non-volatile memory device 128 may be implemented as a flash memory, PRAM (Phase change RAM), FRAM (Ferroelectric RAM), MRAM (Magnetic RAM), etc. In the non-volatile memory device 128, part or all of data to be stored in the storage device 120b may be stored. As an example, all types of information required to control the storage device 120b may be stored in the non-volatile memory device 128.

Program codes and information for executing the methods shown in FIGS. 11 and 12 may be stored in the non-volatile memory device 128. Alternatively, a mapping table for converting a logical block address to a virtual block address based on a virtual zone or a virtual band, and position information regarding a position where servo correction data is to be written as shown in FIGS. 9A to 9G may be stored in the non-volatile memory device 128. Still alternatively, code objects for implementing various functions of the storage device 120b may be stored in the non-volatile memory device 128. If the mapping table and the aforementioned program codes and information are stored in the non-volatile memory device 128, the storage device 120b may load the mapping table and the aforementioned program codes and information stored in the non-volatile memory device 128 to the RAM 122 for use.

Figure 4A:
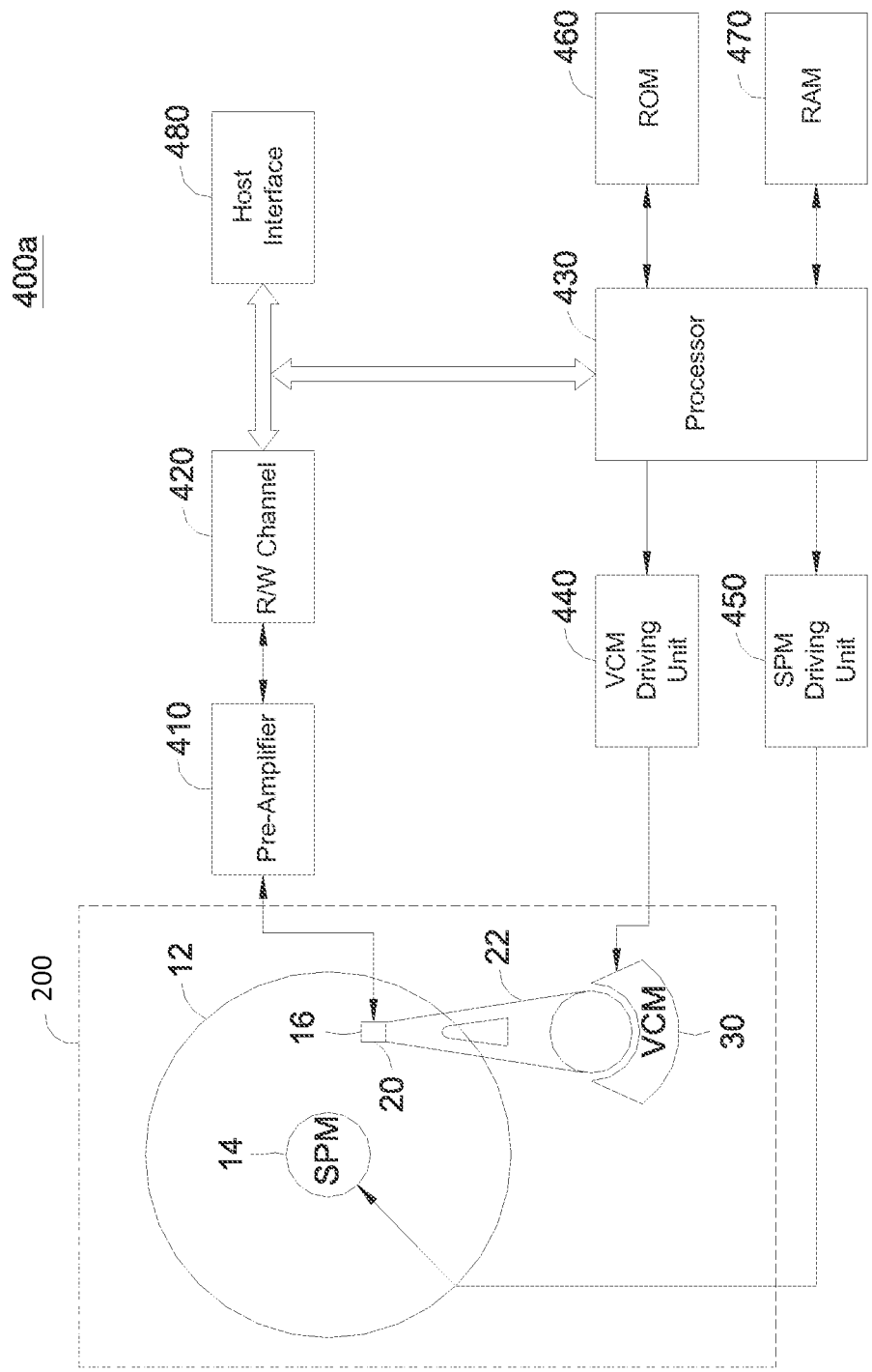
FIG. 4A is a block diagram showing an electric function of a storage device in a case where a storage device of FIG. 1A is a disk drive.

FIG. 4A is a block diagram showing an electric function of the storage device 120a in a case where the storage device 120a of FIG. 1A is a disk drive.

Referring to FIG. 4A, the disk drive 400a, an embodiment of the storage device 120a includes a head disk assembly 200, a pre-amplifier 410, a read/write channel (R/W CHANNEL) 420, a processor 430, a voice coil motor (VCM) driving unit 440, a spindle motor (SPM) driving unit 450, a ROM 460, a RAM 470 and a host interface 480. A configuration of the disk drive 400a is not limited to the configuration of FIG. 4A.

The processor 430 may be implemented as a digital signal processor (DSP), a micro processor, a micro-controller, etc. However, the present invention is not limited to this. The processor 430 controls the read/write channel 420 to read or write information from/onto the disk 12 in response to a command received from the host device 110 via the host interface 480.

Figure 7A:
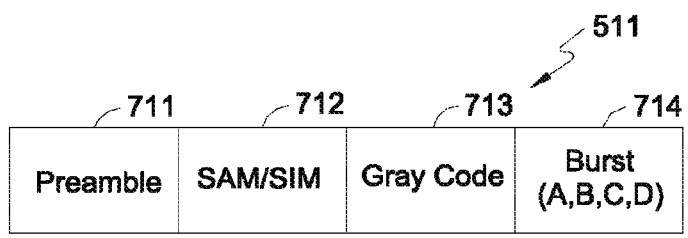
FIG. 7A is a view showing an example of a detailed layout of a servo area of FIG. 5.
Figure 7B:
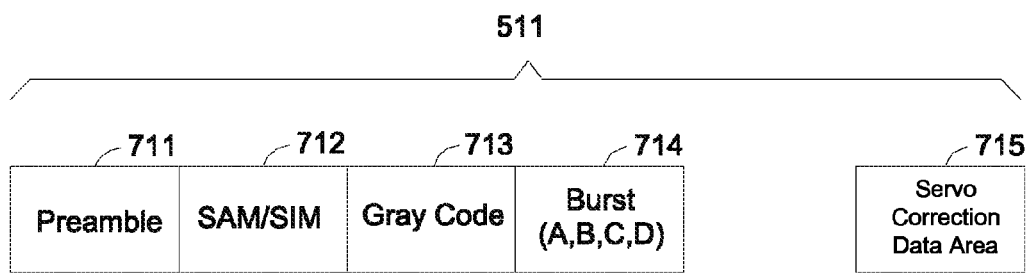
FIG. 7B is a view showing another example of a detailed layout of a servo area of FIG. 5.

It should be interpreted that the read/write channel 420 includes a servo channel (not shown) for reading, from the disk 12, servo information included in a servo area to be explained in FIG. 7A or 7B, and for reading servo correction data written on the disk 12. However, it is assumed in the following descriptions that the servo information and the servo correction data are read via the read/write channel 420, and the servo correction data is written via the read/write channel 420.

The processor 430 is coupled to the VCM driving unit 440 for supplying a driving current for driving the VCM 30. The processor 430 may supply a control signal to the VCM driving unit 440 so as to control movement of the head 16. Accordingly, the servo control of the present invention may include controlling a position of the head 16 by the VCM driving unit 440.

The processor 430 is also coupled to the SPM driving unit 450 for supplying a driving current for driving the spindle motor 14. When power is supplied, the processor 430 may supply a control signal to the SPM driving unit 450 so as to rotate the spindle motor 14 at a target speed.

The processor 430 is coupled to the ROM 460 and the RAM 470, respectively. Firmware and control data for controlling a disk drive 400a are stored in the ROM 460. Program codes and information for executing the servo correction data writing method of FIG. 11 and the servo error signal correcting method of FIG. 12 may be stored in the ROM 460.

In an initial mode, program codes stored in the ROM 460 or the maintenance cylinder area of the disk 12 may be loaded to the RAM 470 under control of the processor 430, and may be used by the processor 430. The RAM 470 may be implemented as a dynamic random access memory (DRAM) or a static random access memory (SRAM). The RAM 470 may be designed to operate in a single data rate (SDR) manner or a double data rate (DDR) manner.

The processor 430 may control the disk drive 400 to execute the servo correction data writing method of FIG. 11 and the servo error signal correcting method of FIG. 12, using the program codes and information stored in the ROM 460 or the maintenance cylinder area of the disk 12.

The processor 430 may generate servo correction data for correcting a servo error signal based on servo information read from a servo area of the disk 12 via the R/W channel 420, and may control the R/W channel 420 and the VCM driving unit 440 to write the generated servo correction data on the disk 12 as one of patterns shown in FIGS. 9A to 9G.

Hereinafter, a read operation and a write operation of the disk drive 400a will be explained.

During a data read operation, the pre-amplifier 410 of the disk drive 400a amplifies an electric signal sensed by the head 16 from the disk 12. Then, the read/write channel 420 converts a signal output from the pre-amplifier 410 into a digital signal, and performs decoding to detect data. The processor 430 corrects the detected data using an error correction code (e.g., Reed-Solomon code). Then, the processor 430 converts the error-corrected detected data into stream data, and transfers the stream data to the host device 110 through the host interface 480.

Servo correction data written on the disk 12 and servo information included in a servo area are read via the head 16, and then are transmitted to the processor 430 via the read/write channel 420. The processor 430 may perform servo control by correcting a generated servo error signal such as a phase error signal into the received servo correction data, using the received servo information.

In a data write operation, the disk drive 400a receives data from the host device 110 via the host interface 480. The processor 430 adds to the received data, an error correction symbol using a Reed-Solomon code. Then, the data having the error correction symbol added thereto by the read/write channel 420 is encoded to be suitable for a write channel. Then, the data encoded by the pre-amplifier 410 is written on the disk 12 by the head 16 to which an amplified write current is applied.

Once the servo information and the servo correction data are received from the disk 12 through the head 16 and the read/write channel 420, the processor 430 performs servo control by correcting a generated servo error signal such as a phase error signal into the received servo correction data, using the received servo information.

The RAM 470 and the ROM 460 may be referred to as a single information storage unit.

Figure 4B:
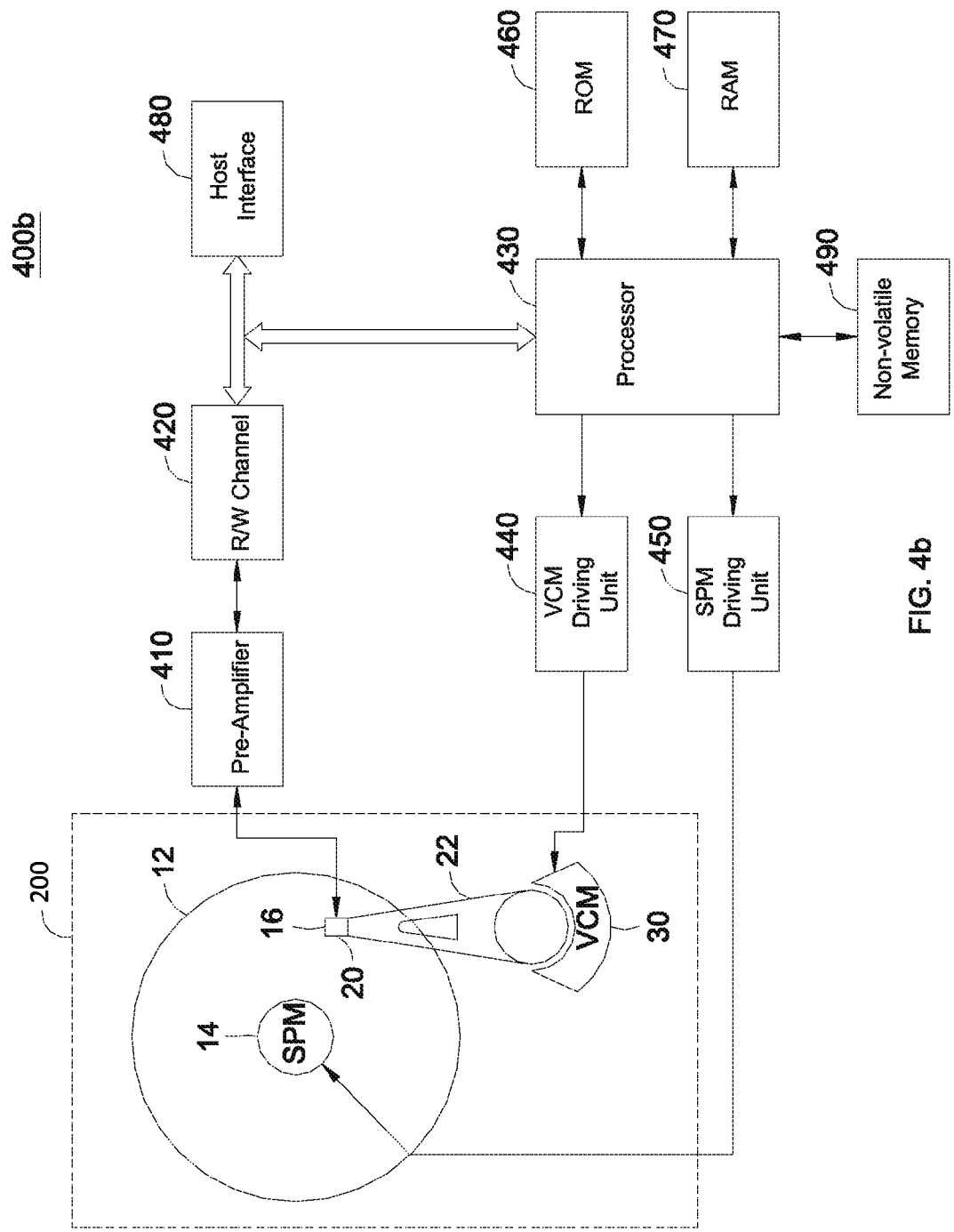
FIG. 4B is a block diagram showing an electric function of a storage device in a case where a storage device of FIG. 1B is a disk drive.

FIG. 4B is a block diagram showing an electric function of the storage device 120b in a case where the storage device 120b of FIG. 1B is a disk drive.

The disk drive 400b of FIG. 4B further comprises a non-volatile memory device 490, in addition to the disk drive 400a of FIG. 4A. In the non-volatile memory device 490, part of data to be stored in the disk drive 400b may be stored. As an example, all types of information required to control the disk drive 400b may be stored in the non-volatile memory device 490.

Program codes and information for executing the methods shown in FIGS. 11 and 12 may be stored in the non-volatile memory device 490. Alternatively, a mapping table for converting a logical block address (logical address) to a virtual block address (virtual address) based on a virtual zone or a virtual band, and position information regarding a position where servo correction data is to be written as shown in FIGS. 9A to 9G may be stored in the non-volatile memory device 490. Still alternatively, code objects for implementing various functions of the storage device 400b may be stored in the non-volatile memory device 490.

The processor 430 is coupled to the ROM 460, the RAM 470 and the non-volatile memory 490, respectively. Firmware and control data for controlling a disk drive are stored in the ROM 460. Program codes and information for executing the methods shown in FIGS. 11 and 12, and position information regarding a position where servo correction data is to be written as shown in FIGS. 9A to 9G may be stored in the ROM 460. Alternatively, the program codes and information for executing the methods shown in FIGS. 11 and 12, and position information regarding a position where servo correction data is to be written as shown in FIGS. 9A to 9G may be stored in the maintenance cylinder area of the disk 12 or in the non-volatile memory 490, rather than in the ROM 460.

In an initial mode, program codes and information stored in the ROM 460, or the disk 12, or the non-volatile memory 490 may be loaded to the RAM 470 under control of the processor 430.

Explanations about the same components of FIG. 4B as the components of FIG. 4A will be omitted. A layout of the storage medium 124 of FIGS. 1A and 1B, and the disk 12 of FIGS. 4A and 4B may be defined as a layout shown in FIG. 5.

Figure 5:
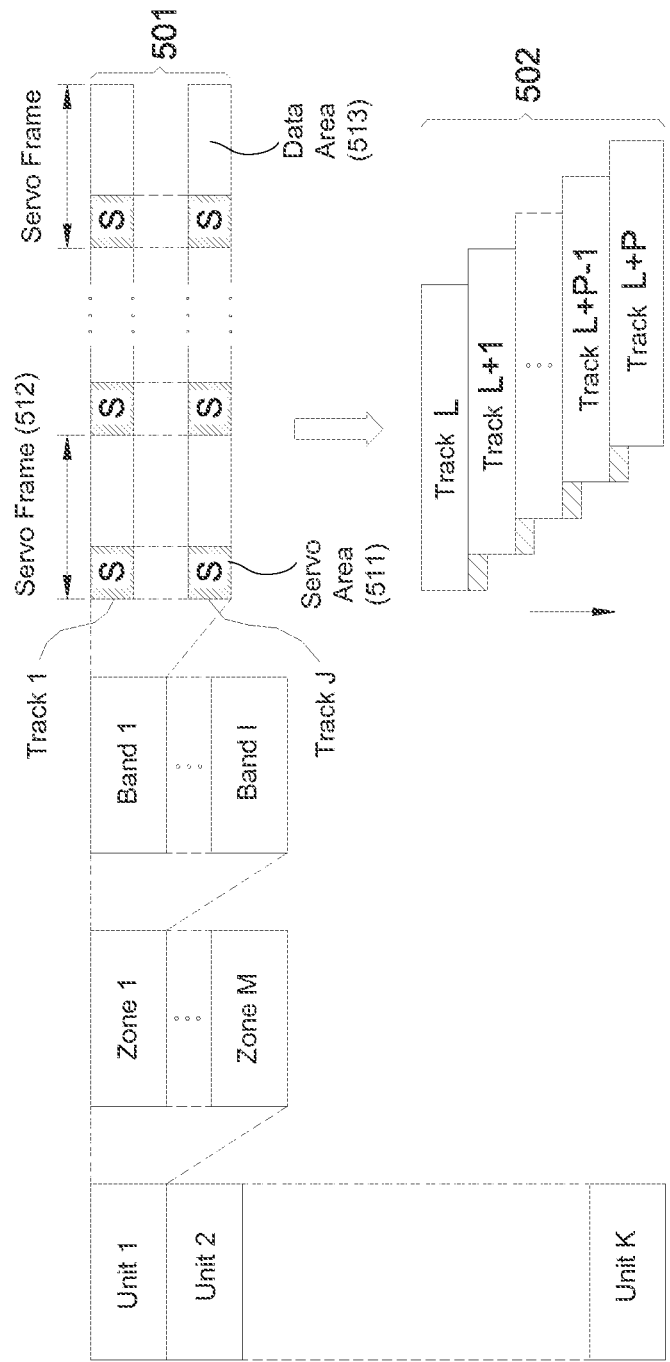
FIG. 5 is a view showing an example of a layout of a storage medium or a disk according to preferred embodiments of the present invention.

FIG. 5 is a view showing an example of a layout of the storage medium 124 or the disk 12 according to preferred embodiments of the present invention. For convenience, a layout of the disk 12 will be hereinafter explained. However, it should be noted that the storage medium 124 of FIGS. 1A and 1B has the same layout as the disk 12 of FIG. 4B.

Referring to FIG. 5, the disk 12 may include 'K' units ('K' is natural number). A single unit may include 'M' zones ('M' is natural number). A single zone may include 'I' bands ('I' is natural number). Each zone may include the same number of bands according to a physical structure of the disk 12, but may include different number of bands. The band may be referred to as a virtual band (VB), or a physical band (PB), or a disk band (DB). The virtual band is a band based on a physical address or a physical position of the disk 12, which is based on an HDD Translation Layer (HTL) to be later explained.

A single band may include 'J' tracks ('J' is natural number) as shown in FIG. 5 (501), or may include a plurality of tracks. For enhanced write density, data may be written on each band by a shingled write operation method. If data is written on each band by a shingled write operation method, data may be written in the arrow direction on tracks 1~J included in the band (refer to 501 of FIG. 5), as data is written on tracks L~L+P ('L' is natural number and 'P' is natural number) in a state where the tracks L~L+P partially overlap the previous tracks (refer to 502 of FIG. 5). For instance, data is written on track L+1 in a state where the track L+1 partially overlaps track L, and data is written on track L+P in a state where the track L+P partially overlaps track L+P−1.

If the band of the tracks L~L+P (502 of FIG. 5) has the same physical area as the band of the tracks 1~J (501 of FIG. 5), the number of tracks included in the band of the tracks L~L+P (written with the shingled write method) may be greater than that included in the band of the tracks 1?J (not written with the shingled write method). The reason is because the tracks L~L+P (502) have greater TPI (Track Per Inch) than the tracks 1~J (501) due to the partial overwriting of included tracks.

Figure 6A:
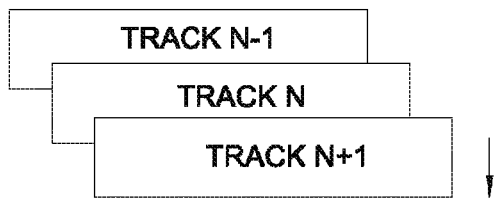
FIGS. 6A and 6B are views for explaining restriction conditions in case of writing data based on a shingled write operation.
Figure 6B:
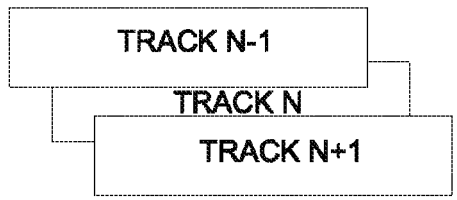

During a shingled write operation, data should be written in one direction. In case of the disk 12 of FIG. 4A, data should be written in one of inner and outer circumferential directions of the disk 12 due to restriction conditions shown in FIGS. 6A and 6B. FIGS. 6A and 6B are views for explaining restriction conditions when writing data based on a shingled write operation.

If a shingled write operation is performed in the arrow direction of FIG. 6A, a flux is generated only in the arrow direction. Therefore, when performing data write by a shingled write operation, a restriction condition that data cannot be written on track N−1 after being written on track N should be satisfied. If data is written on track N−1 after being written on track N in the opposite direction to the shingled write direction of FIG. 6B, the data written on the track N may be erased due to ATI (Adjacent Track Interference).

In order to solve such problem, required is a technique for dynamically allocating a physical address of the disk 12 to a logical address received from the host device 110, such that data can be written in one of inner and outer circumferential directions of the disk 12 by a shingled write operation.

HTL is a technology proposed to satisfy restriction conditions when performing data write based on a shingled write operation. According to the HTL, a logical block address transmitted from the host device 110 is converted to a virtual block address, and the virtual block address is converted to a physical block address of the disk 12. This enables accessing the disk 12. Here, the physical block address may be a Cylinder Head Sector (CHS).

When the disk 12 performs data write based on a shingled write operation, servo correction data should be also written under the aforementioned restriction conditions. The servo correction data may be written on a servo sector included in a servo area 511 or on a data sector included in a data frame 513 in units of servo frames 512 based on the servo area 511. Alternatively, the servo correction data may be written on at least one track in units of bands. The servo correction data has a signal amplitude greater than that of general data. Accordingly, if servo correction data is written based on a shingled write operation, the data may be erased due to a write operation on the next track (or neighboring track). In order to solve such problem, servo correction data may be written based on one of the methods shown in FIGS. 9A to 9G.

Referring to FIG. 5, one track may include a plurality of servo frames 512. The servo frame 512 may include one servo area 511 and one data frame 513. The servo area 511 may include at least one servo sector. The data frame 513 may include at least one data sector. It can be defined that tracks L~L+P (each of 'L' and 'P' is natural number) (502) include the servo area 511 and the data frame 513 as shown in 501 of FIG. 5.

FIG. 7A is a view showing an example of a detailed layout of the servo area 511 of FIG. 5, in which servo correction data is not included. Referring to FIG. 7A, the servo area 511 includes a preamble 711, a servo synchronization indication signal 712, a gray code 713, and burst signals 714 ('A, B, C and D').

The preamble 711 provides clock synchronization when reading servo information, and provides a constant timing margin by having a gap prior to the servo frame 712. And, the preamble 711 may be used to determine a gain of an automatic gain control (AGC) circuit.

The servo synchronization indication signal 712 is composed of a servo address mark (SAM) and a servo index mark (SIM). The servo address mark is a signal indicating start of the servo area 511, and the servo index mark is a signal indicating start of the first servo area 511 in a track. The servo address mark and the servo index mark may have unique patterns.

The gray code 713 provides a track position on the servo area 511 in the disk 12. The burst signals 714 are used to control the head 16 to follow a central part of the track 34. For instance, the burst signals 714 are implemented as four patterns 'A, B, C and D'. That is, a position error signal (PES) for tracking control is generated from a combination of the four burst patterns A, B, C and D. However, the burst signals are not limited to the aforementioned 4 patterns. As an example, the burst signals may be implemented as 6 patterns.

FIG. 7B is a view showing another example of a detailed layout of the servo area 511 of FIG. 5, in which servo correction data is included. Referring to FIG. 7B, the servo area 511 includes a preamble 711, a servo synchronization indication signal 712, a gray code 713, burst signals 714 ('A, B, C and D'), and a servo correction data area 715. The servo correction data area 715 may include a plurality of servo sectors on which servo correction data of a plurality of tracks have been written as shown in FIGS. 9A to 9E to be later explained. The servo area 511 may be allocated to each track of a servo frame 512. Alternatively, the servo area 511 may be allocated to a plurality of tracks using burst signals.

Figure 8:
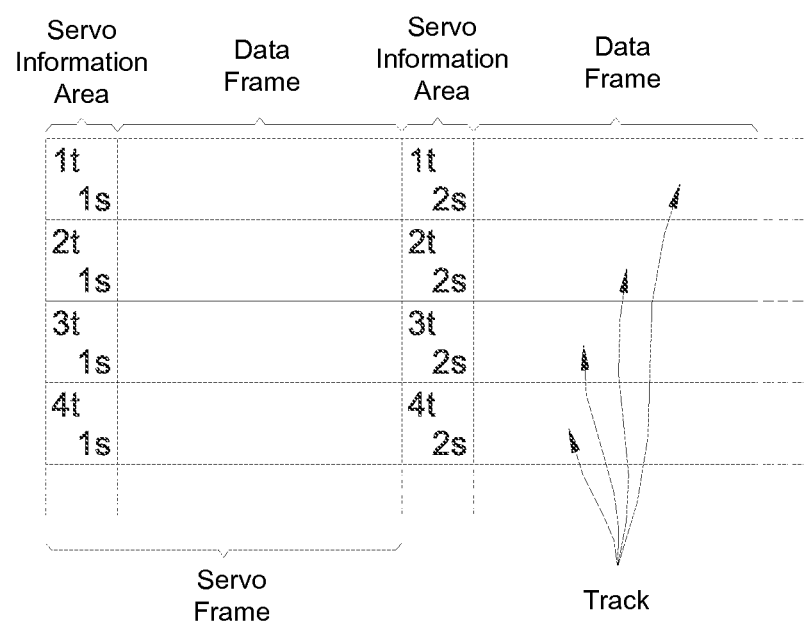
FIG. 8 is a view showing an example of a layout of a servo frame in a case where a single servo information area is allocated to 4 data tracks.

FIG. 8 is a view showing an example of a layout of a servo frame in a case where a single servo area 511 (1s(servo)) is allocated to 4 data tracks. Referring to FIG. 8, if one servo area 511 is allocated to 4 data tracks, a preamble 711, a servo synchronization indication signal 712 and a gray code 713 are used in the 4 data tracks in the same manner. And, a number which can be divided by the burst signals 714 (e.g., 512) is divided by the number of the data tracks (4), and servo correction data for controlling a central part of each track (1t (track), 2t, 3t and 4t) when performing tracking may be generated based on a value obtained by the division. Information regarding the number which can be divided by the burst signals 714 and the number of tracks may be stored in the ROM 460 or in the maintenance cylinder area of the disk 12. And, the stored information may be read by the processor 430 thus to be loaded to the RAM 470. The processor 430 may control track pitch based on the number which can be divided by the burst signals 714 and the number of tracks.

The preamble 711, the servo synchronization indication signal 712, the gray code 713, and the burst signals 714 written on the servo area 511 may be permanently written on the servo area 511, by an Offline Servo Track Write (OLSTW) method or a Conventional Servo Track Write (CSTW) method. The OLSTW method indicates a method for assembling the disk 12 on which servo information has been written to the head assembly 200, and the CSTW method indicates a method for permanently writing servo information to the disk 12 using additional servo write equipment.

Once the disk 12 on which servo information has been written is mounted to the servo area 511, the storage devices 400a and 400b may generate servo correction data based on the servo information written on the servo area 511, and may write the servo correction data on positions shown in FIGS. 9A to 9G.

FIGS. 9A to 9G are views showing examples of a layout of the disk 12 on which servo correction data has been written according to preferred embodiments of the present invention. More specifically, FIGS. 9A to 9G are views showing positions of the disk 12 on which servo correction data of a band unit has been written, the disk 12 where data is written or read in units of bands.

Position information regarding positions where servo correction data is written may be stored in the ROM 460 or in the maintenance area of the disk 12, and may be loaded to the RAM 470 by the processor 430.

Figure 9A:
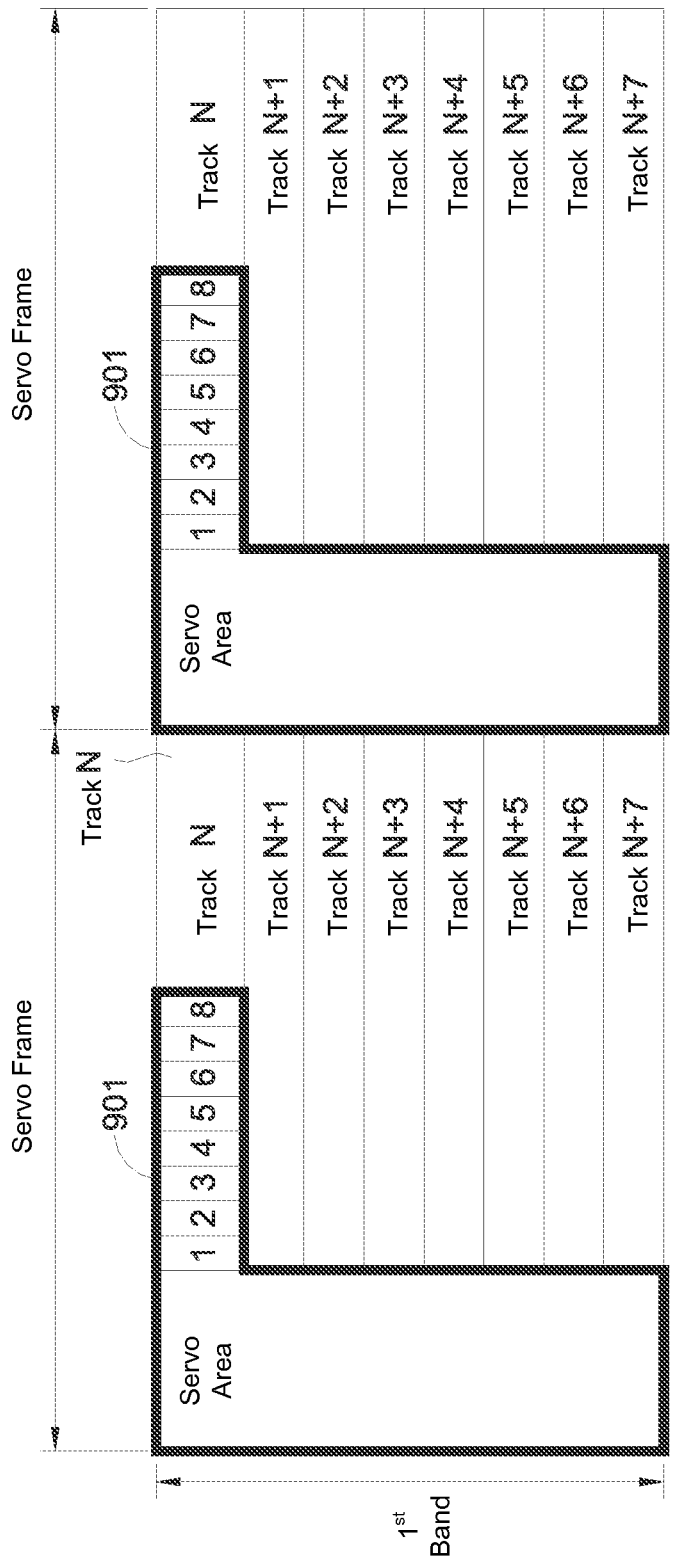
FIGS. 9A to 9G are views showing examples of a layout of a disk on which servo correction data has been written according to preferred embodiments of the present invention.

FIG. 9A illustrates that servo correction data has been written in units of servo frames, in a case where servo correction data of a plurality of tracks has been written on at least one track in units of bands including a plurality of tracks. Referring to FIG. 9A, servo correction data of a plurality of tracks N~N+7 has been written, in units of servo frames, on a plurality of servo sectors 1~8 of first tracks included in a band. The plurality of tracks N~N+7 are all tracks included in the band. However, servo correction data written on servo sectors 1~8 is servo correction data in a servo frame section including the servo sectors t~8, in the plurality of tracks N~N+7. FIG. 9A illustrates an example that 8 tracks are included in one band. Accordingly, servo correction data has been written on 8 servo sectors (1~8) of the first track. If 'T' tracks ('T' is natural number equal to or more than '1') are included in one band, servo correction data of 'T' tracks is written on 'Y' servo sectors ('Y' is natural number equal to or more than '1') in units of servo frames, in the first tracks included in the band. It should be interpreted that the 'T' and 'Y' may have the same value.

FIG. 9A illustrates a case where the first track N has track pitch greater than track pitches of tracks N+1 N+7. As shown in FIG. 8, the processor 430 may set the first track to have a pitch greater than that of another track, using a value (X) calculated by the following formula 1, the value based on a number (BD) which can be divided by the burst signals 714 included in the servo area 511, the number of servo areas (SN) included in one band, and the number of tracks (TN) included in one band.

$$X = BD \times SN / TN \quad \text{[Formula 1]}$$

Referring to FIG. 9A, the track N may include at least one data sector behind servo sectors 1~8 where servo correction data of the track N+7 has been written.

Figure 9B:
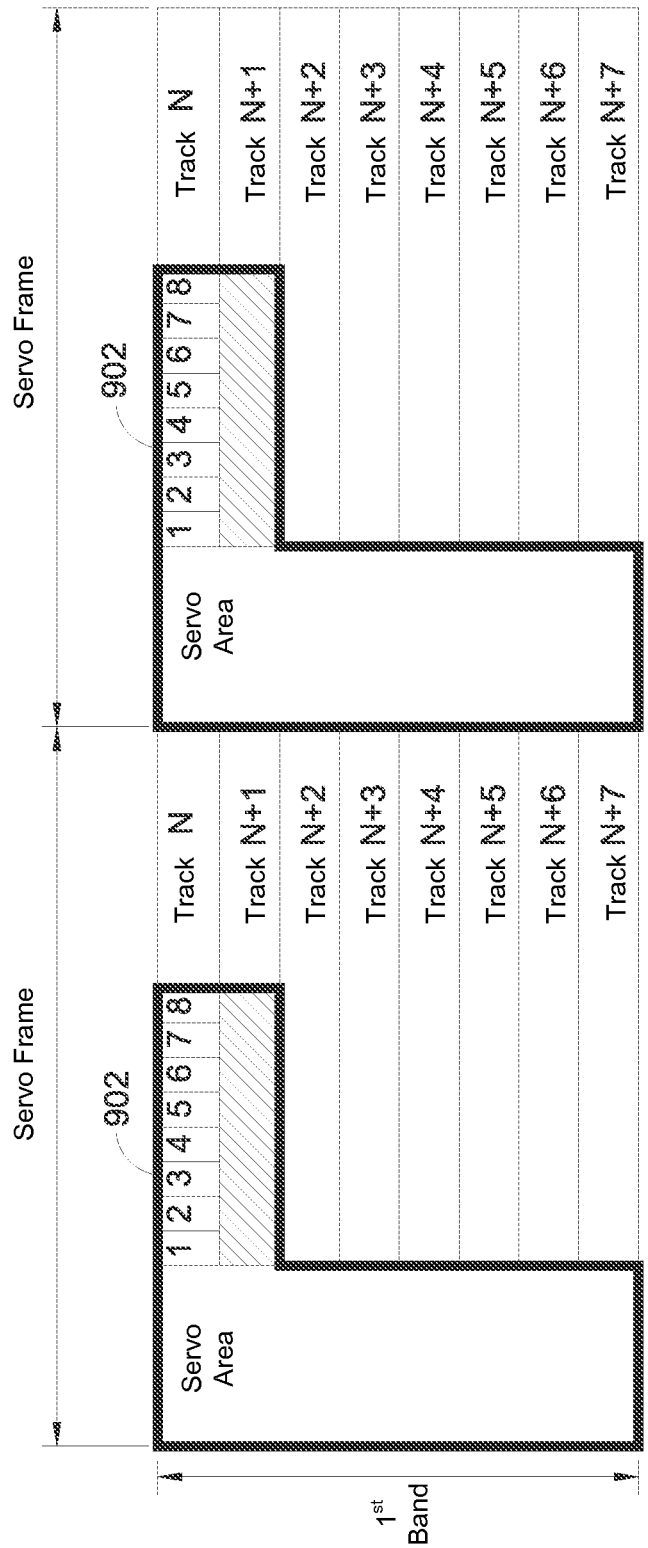

FIG. 9B illustrates that servo correction data has been written in units of servo frames, in a case where servo correction data of a plurality of tracks has been written on at least one track in units of bands including a plurality of tracks. Referring to FIG. 9B, in the track N+1 subsequent to the track N where servo correction data has been written, a section corresponding to servo sectors '1~8' of the track N is set as a blank section. The servo correction data written on the track N is the same as the servo correction data written in FIG. 9A.

Figure 9C:
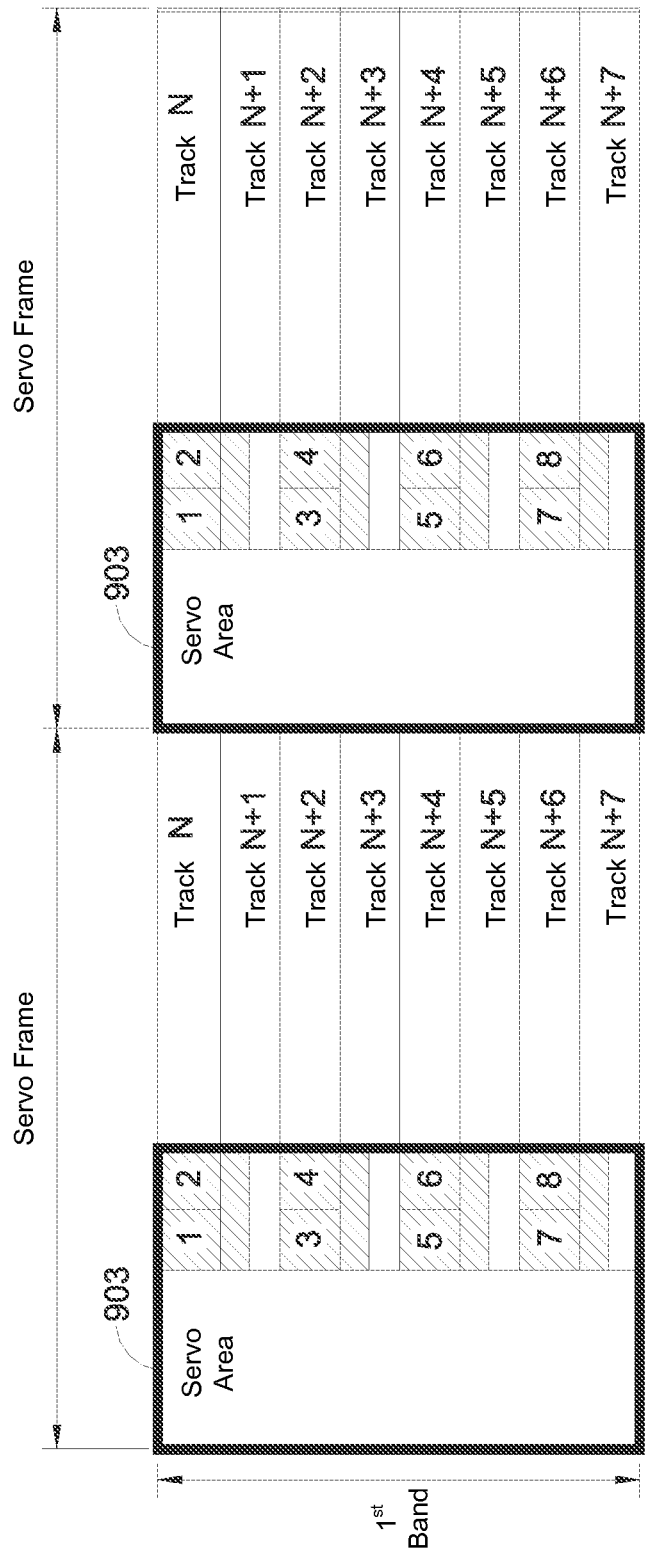

FIG. 9C illustrates that servo correction data has been written in units of servo frames, in a case where servo correction data of a plurality of tracks has been written on at least one track in units of bands including a plurality of tracks. Referring to FIG. 9C, servo correction data is written every two tracks, and a track where servo correction data has not been written is set to have a section corresponding to servo correction data written on the previous track, as a blank section.

Referring to FIG. 9C, a track where servo correction data has been written is track 2R-1 ('R' is natural number equal to or more than '1'), and servo correction data written on the track 2R-1 may be referred to as servo correction data in a servo frame section of track 2R-1 and track 2R included in one band.

Figure 9D:
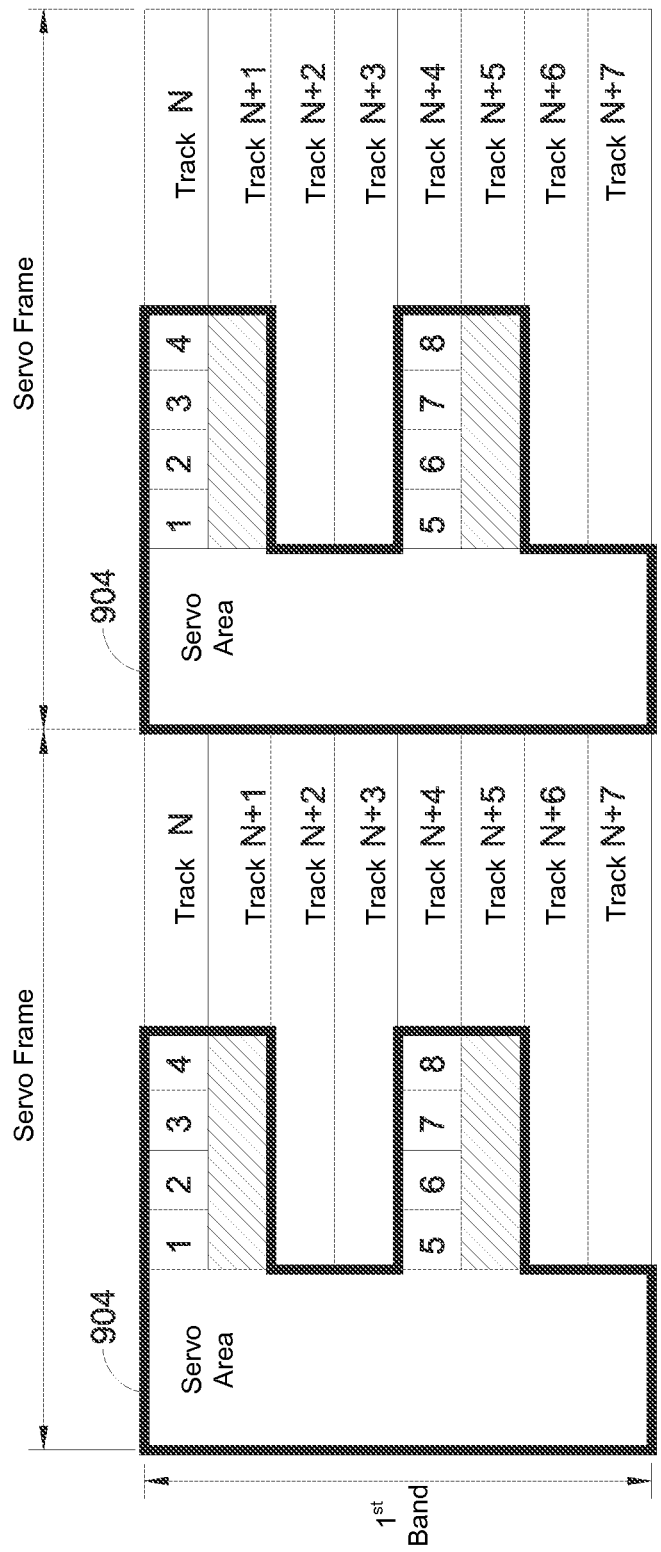

FIG. 9D illustrates that servo correction data has been written in units of servo frames, in a case where servo correction data of a plurality of tracks has been written on at least one track in units of bands including a plurality of tracks. Referring to FIG. 9D, servo correction data is written every four tracks, and servo correction data written on a single track is servo correction data in servo frame sections of 4 tracks. Accordingly, FIG. 9D illustrates 'Y' sectors on which servo correction data has been written every 'T' tracks. Here, the 'T' and 'Y' may be set to have the same value, '4'.

Figure 9E:
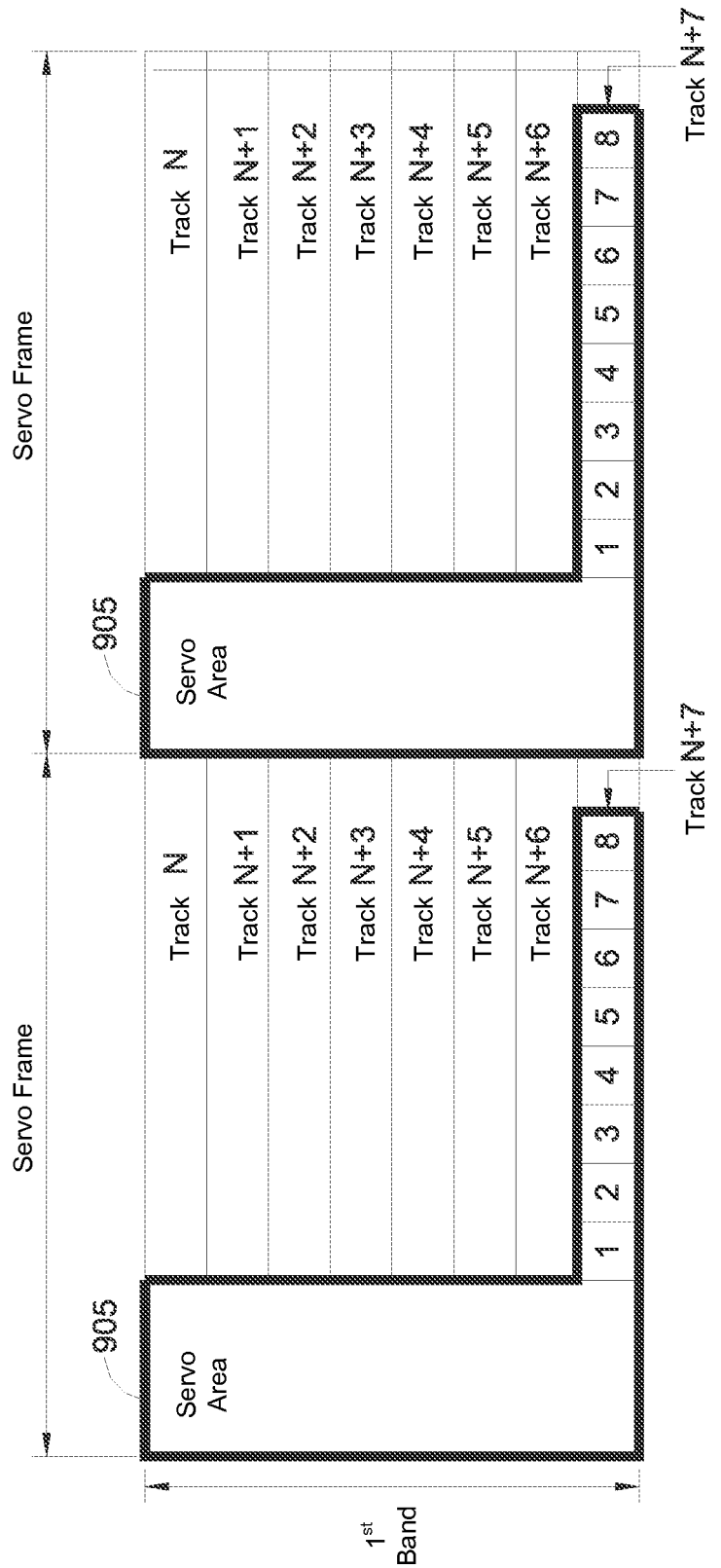

FIG. 9E illustrates that servo correction data has been written in units of servo frames, in a case where servo correction data of a plurality of tracks has been written on at least one track in units of bands including a plurality of tracks.

Referring to FIG. 9E, servo correction data is written on servo sectors 1~8 of the last track. Servo correction data written on the servo sectors 1~8 is servo correction data in a servo frame section in one band, the servo frame section corresponding to a servo frame section including servo sectors 1~8 in all tracks included in another band. Referring to FIG. 9E, the last track N+7 may include at least one data sector behind servo sectors 1~8.

Figure 9F:
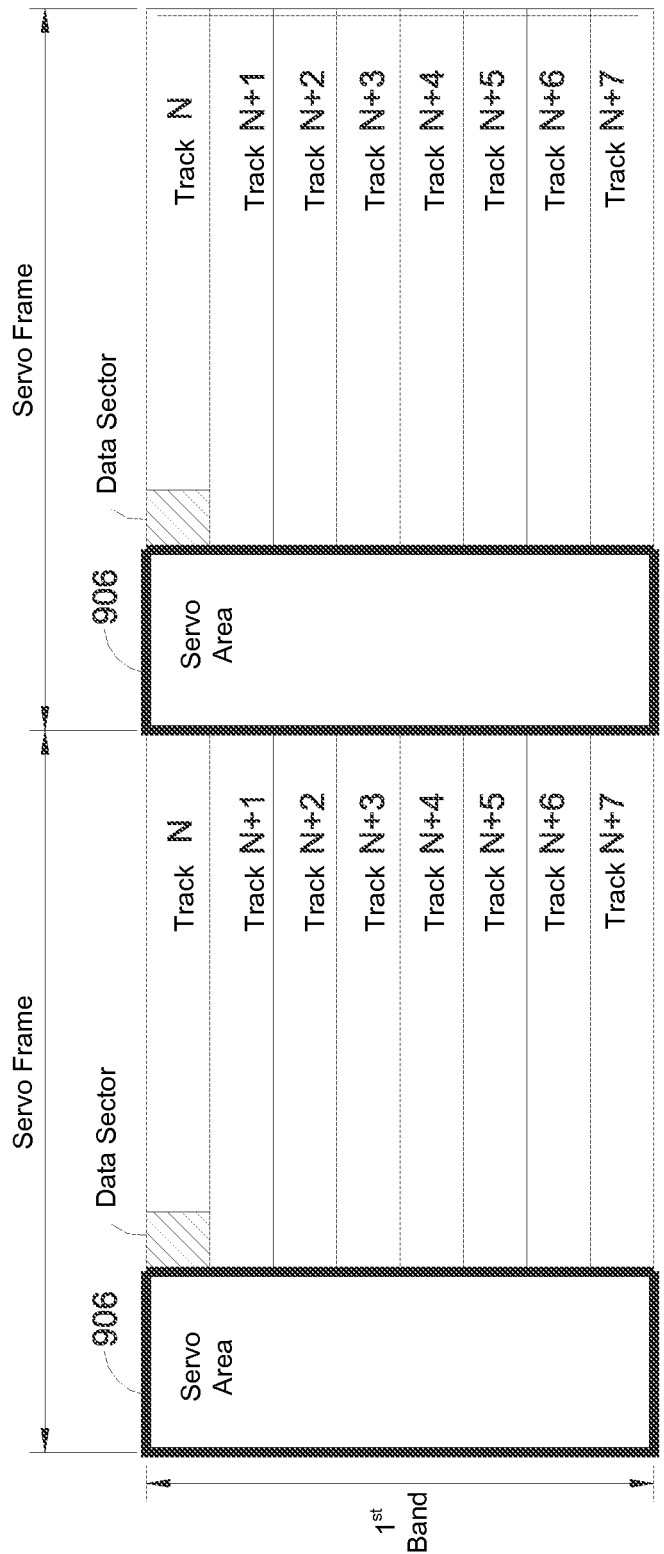

FIG. 9F illustrates that servo correction data has been written in units of servo frames, in a case where servo correction data of a plurality of tracks has been written on at least one track in units of bands including a plurality of tracks. Referring to FIG. 9F, servo correction data of all tracks included in a band has been written in units of servo frames, in a servo frame section corresponding to at least one data sector of the first track (track N). A plurality of data sectors may be used to write servo correction data.

Figure 9G:
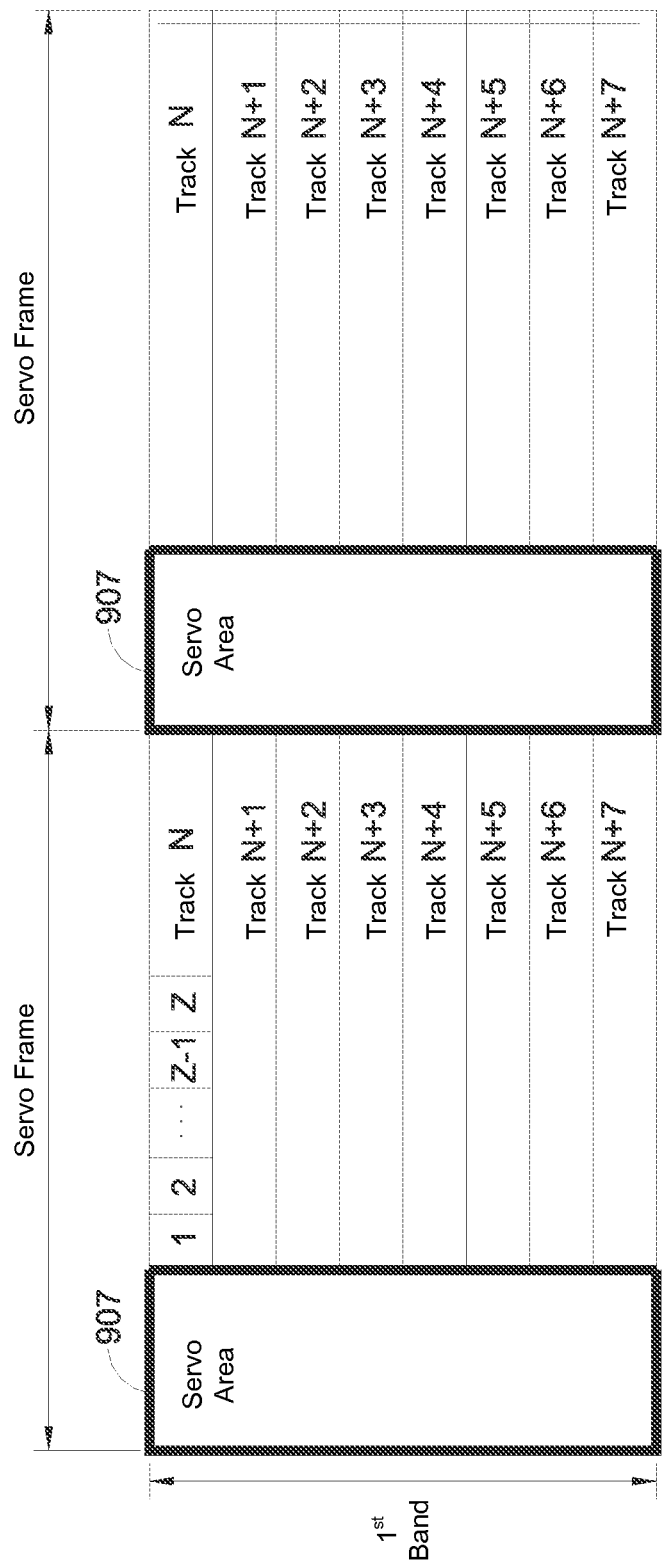

FIG. 9G illustrates that servo correction data in a servo frame unit of all tracks included in a band has been written on the first track of one servo frame, in a case where servo correction data of a plurality of tracks has been written on at least one track in units of bands including a plurality of tracks.

Referring to FIG. 9G, if one band includes 'A' servo frames ('A' is natural number equal to or more than '1'), servo correction data of each track in each servo frame section is written on 'Z' data sectors ('Z' is natural number equal to or more than '1') of the first track included in the first servo frame section. Here, the 'A' and 'Z' may be set to have the same value.

The reference numerals 901, 902, 903, 904 and 905 of FIGS. 9A to 9E may be referred to as the servo area of FIG. 7B, and the reference numerals 906 and 907 of FIGS. 9F and 9G may be referred to as the servo area of FIG. 7A. The processor 430 may generate servo correction data based on servo information read from the servo area 511, the servo correction data to be written on the servo correction data area 715 included in the servo area 511, or to be written on preset data sectors of FIGS. 9F and 9G. Then, the processor 430 writes the generated servo correction data on the servo correction data area 715 included in the servo area 511, or on a specific data sector, based on one of patterns shown in FIGS. 9A to 9G. And, the processor 430 corrects a servo error signal which is based on servo information read from the servo area 511, using servo correction data read from the servo correction data area 715 or the specific data sector.

Figure 10:
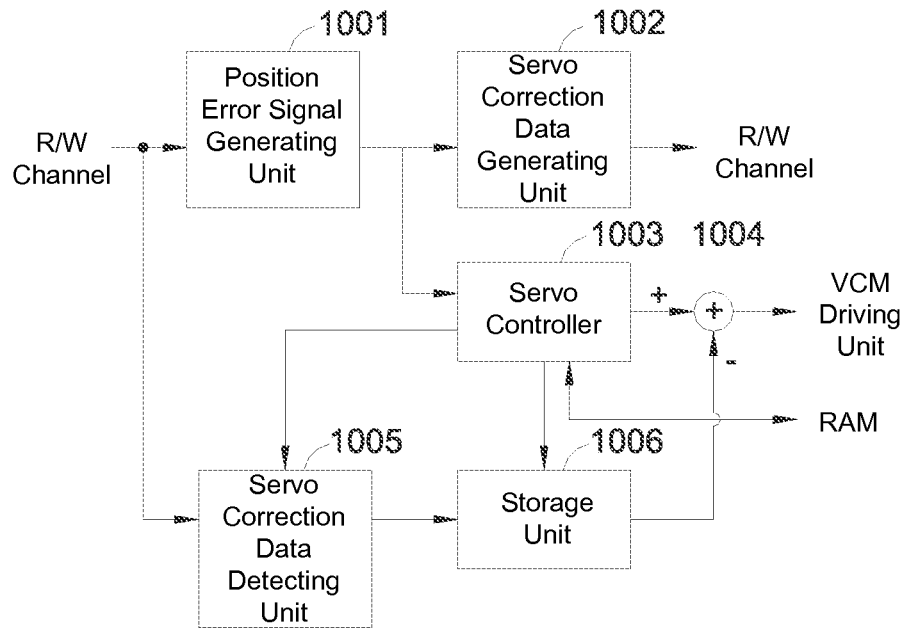
FIG. 10 is a function block diagram of a processor included in a storage device according to preferred embodiments of the present invention.

To this end, the processor 430 may have a configuration of FIG. 10. FIG. 10 is a function block diagram of the processor 430 which performs servo control by generating servo correction data which is based on a servo position error signal (PES) and by correcting a servo error signal. However, the function block diagram of the processor 430 is not limited to FIG. 10. That is, the function block diagram of the processor 430 of FIG. 10 may be also interpreted as a function block diagram of the processor 121 of FIG. 1.

Referring to FIG. 10, the processor 430 includes a position error signal generating unit 1001, a servo correction data generating unit 1002, a servo controller 1003, a subtractor 1004, a servo correction data detecting unit 1005 and a storage unit 1006.

The position error signal generating unit 1001 generates a position error signal (PES) per sector based on burst signals received from the R/W channel 420. For instance, if the burst signals are implemented as 4 patterns (A, B, C and D), the position error signal generating unit 1001 may generate a position error signal per sector through combinations of 'A-B' and 'C-D'.

The servo correction data generating unit 1002 generates servo correction data based on a position error signal (PES) per sector, the PES received from the position error signal generating unit 1001. For instance, the servo correction data generating unit 1002 may generate Repeated Run Out (RRO) as servo correction data, based on an average value of PES per sector received from the position error signal generating unit 1001 while the disk 12 rotates a plurality of times. Here, the RRO is in a servo frame section of each track included in one band.

The generated servo correction data is written on the disk 12 via the R/W channel 420.

Once PES per sector is generated from the position error signal generating unit 1001 while the disk 12 rotates a plurality of times, and servo correction data per track is generated by using the generated PES, the servo controller 1003 outputs a signal for controlling the VCM driving unit 440 to write data on a preset position of the disk 12. The servo correction data per track is servo correction data of tracks included in the band of FIGS. 9A to 9G, which is servo correction data of a servo frame unit.

Once servo correction data is written on all areas of the disk 12 and a data read operation or a data write operation in the disk 12 is performed, the servo correction data detecting unit 1005 detects servo correction data from a signal received via the R/W channel 420. The servo correction data may be detected, based on a section where servo correction data is transmitted, among servo information received by a control signal provided from the servo controller 1003, based on position information stored in the RAM 470 and regarding positions where servo correction data has been written. The control signal provided to the servo correction data detecting unit 1005 from the servo controller 1003 may be a signal for controlling output of a signal input to the servo correction data detecting unit 1005 based on the position information.

Servo correction data written on a position which is based on one of patterns shown in FIGS. 9A to 9G is detected, and the detected servo correction data is stored in the storage unit 1006.

Based on the position information provided from the RAM 470, the servo controller 1003 may read, from servo correction data stored in the storage unit 1006, servo correction data in a servo frame section of a track corresponding to a currently-input PES of a sector unit. Then, the servo controller 1003 may transmit the read servo correction data to the subtractor 1004.

The subtractor 1004 may perform servo control by correcting a servo error signal, and by transmitting the corrected servo error signal to the VCM driving unit 440. Here, the servo error signal is corrected by deducting servo correction data received from the storage unit 1006, from a servo error signal output from the servo controller 1003. The servo error signal output from the servo controller 1003 is a servo error signal of a track unit or a servo frame unit, the servo error signal detected through calculation of PES per sector. And, the servo error signal may be referred to as a servo control signal.

FIG. 11 is a flowchart showing an operation for writing servo correction data according to an embodiment of the present invention. Hereinafter, the operation for writing servo correction data will be explained based on the processor 430 of FIG. 4A. However, it should be understood that the operation for writing servo correction data may be also applied to the processor 430 of FIG. 4*b* and the processor 121 of FIGS. 1A and 1B.

Once servo information is received via the R/W channel 420 in a track following mode for tracking the disk 12 (S1101), the processor 430 generates a position error signal per sector based on the received servo information, like the signal from the position error signal generating unit 1001 of FIG. 10 (S1102).

The processor 430 collects position error signals generated per sector while the disk 12 rotates a plurality of times, and generates servo correction data in a servo frame section of each track (S1103). The step of generating the servo correction data using PES per sector may be performed in the same manner as generating servo correction data by the servo correction data generating unit 1002 of FIG. 10.

Once servo correction data in a servo frame section of each track is generated, the processor 430 writes the generated servo correction data on a preset position of the disk 12 based on position information read from the RAM 470, in one of patterns shown in FIGS. 9A to 9G (S1104).

FIG. 12 is a flowchart showing an operation for correcting a servo error signal according to an embodiment of the present invention. Hereinafter, the operation for correcting a servo error signal will be explained based on the processor 430 of FIG. 4A. However, it should be understood that the operation for correcting a servo error signal may be also applied to the processor 430 of FIG. 4*b* and the processor 121 of FIGS. 1A and 1B.

If servo correction data is received via the R/W channel 420 as aforementioned in FIG. 10 in a state where the storage device 400*a* operates in a data read mode or a data write mode (S1201, S1202), the processor 430 stores the received servo correction data (S1203).

Once a servo error signal in one servo frame section of one track is generated by the servo controller 1003 inside the processor 430 (S1204) as a servo error signal is generated based on servo information received via the R/W channel 420 as aforementioned in FIG. 10, the generated servo error signal is corrected by reading, from servo correction data stored in the storage unit 1006, servo correction data in a servo frame section of a track corresponding to the currently generated servo error signal (S1205). Accordingly, the processor 430 may perform servo control in the storage device 400 by controlling the VCM driving unit 440 based on the corrected servo error signal.

In some embodiments a storage medium may comprise: at least one band, wherein servo correction data of a plurality of tracks is written on at least one track included in the band. The embodiment may include, wherein the servo correction data is written on the at least one track in units of servo frames. The embodiment may include, wherein the at least one track is a first track of the band, and the plurality of tracks are tracks included in the band. The embodiment may include, wherein track pitch of the first track is greater than that of another track included in the band. The embodiment may include, wherein the at least one track is track 2R-1 of the band ('R' is natural number equal to or more than 1), and the plurality of tracks include track 2R-1 and track 2R of the band. The embodiment may include, wherein in a track subsequent to the track on which the servo correction data has been written, a section corresponding to a section where the servo correction data has been written is set as a blank section. The embodiment may include, wherein the servo correction data is written in one servo frame section on the at least one track.

In some embodiments, a storage device may comprise: a storage medium including at least one band; and a processor configured to write servo correction data of a plurality of tracks, on at least one track included in the band. The embodiment may include, wherein the servo correction data is written on the at least one track in units of servo frames. The embodiment may include, wherein during a data read operation or a data write operation from/on the storage medium, the processor is configured to store servo correction data read from the storage medium, and configured to correct a servo error signal of the track in units of servo frames, using the stored servo correction data.

Programs for executing the servo correction data writing method and the servo error signal correcting method may be implemented as a program code stored in a computer-readable storage medium. The storage medium may include ROM, RAM, CD-ROM, a magnetic tape, a floppy disc, an optical data storage device, etc. And, the computer-readable storage medium may be distributed to a computer system connected to a network, and may be stored to be executed as a computer-readable code in a distributed manner.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An apparatus comprising:
   a data storage medium having a first track and a second track;
   first servo correction data corresponding only to the first track and second servo correction data corresponding only to the second track both of which are stored on the first track, and no servo correction data stored on the second track, wherein the first servo correction data and second servo correction data are different from each other; and
   a controller configured to correct servo errors in the first track using the first servo correction data and configured to correct servo errors in the second track using the second servo correction data.

2. The apparatus of claim 1 wherein the data storage medium includes a third track, and the second track and the third track are written in a shingled manner where the second track is partially overwritten by the third track.

3. The apparatus of claim 1 wherein:
the first track includes at least a first servo frame and the second track includes at least a second servo frame, each servo frame including a servo data portion and a user data portion; and
the first and the second servo correction data for the first servo frame and the second servo frame are stored on the first track.

4. The apparatus of claim 3 wherein the first and the second servo correction data are stored as part of the servo data portion of the first track.

5. The apparatus of claim 3 wherein the first and the second servo correction data are stored in data sectors of the user data portion of the first track.

6. The apparatus of claim 1 wherein the first track has a track pitch greater than the second track.

7. The apparatus of claim 1 wherein the second track is immediately subsequent to the first track, and the second track includes a blank area corresponding to an area containing the first and the second servo correction data of the first track.

8. The apparatus of claim 1 further comprising N instances of servo correction data stored on every Nth track of the data storage medium, where N is a natural number.

9. The apparatus of claim 1 wherein the first and the second servo correction data are calculated based on position error signal (PES) data.

10. The apparatus of claim 9 wherein the controller is configured to output a signal based on the first and the second servo correction data for controlling a voice coil motor (VCM) driving unit to move a transducer head to write data on a preset position of the data storage medium.

11. A method comprising:
storing both first servo correction data generated from a servo error detected for a first track and second servo correction data generated from a servo error detected for a second track of a first data storage medium on the first track, wherein the first servo correction data corresponds only to the first track, wherein the second servo correction data corresponds only to the second track, wherein the first servo correction data and the second servo correction data are different from each other, and wherein servo correction data is not stored on the second track; and
correcting servo errors in the first track using the first servo correction data and correcting servo errors in the second track using the second servo correction data.

12. The method of claim 11 further comprising generating the first and the second servo correction data based on position error signals (PES) generated during the operations on the first data storage medium.

13. The method of claim 11 wherein the first data storage medium further includes a third track, and wherein the second track and the third track are written in a shingled manner where the second track is partially overwritten by the third track.

14. The method of claim 13 wherein the second track is immediately subsequent to the first track, and wherein the second track includes a blank area corresponding to an area containing the first and the second servo correction data of the first track.

15. The method of claim 11 further comprising storing the first and the second servo correction data to a second data storage medium; and
correcting servo errors in the first track and the second track of the first data storage medium using the first and the second servo correction data stored to the second data storage medium.

16. A method comprising:
receiving servo information from a first track;
receiving servo information from a second track;
generating a first position error signal (PES) based on the servo information received from the first track;
generating a second position error signal (PES) based on the servo information received from the second track; and
generating first servo correction data responsive to the first PES and second servo correction data responsive to the second PES, wherein the first and the second servo correction data for the first track and the second track are stored on the first track.

17. The method of claim 16 further comprising correcting servo errors in the first track using the first servo correction data and correcting servo errors in the second track using the second servo correction data.

18. The method of claim 17 further comprising:
reading the first and the second servo correction data from the first data storage medium;
storing the first and the second servo correction data to a second data storage medium;
correcting servo errors in the first track and the second track of the first data storage medium using the first and the second servo correction data stored to the second data storage medium.

19. The method of claim 18 wherein tracks of the first data storage medium are divided into servo data zones and user data zones, and further comprising storing the first and the second servo correction data to an area of the user data zone of the first track.

20. The method of claim 19 further comprising:
storing data to the first data storage medium in a shingled manner where the first track is partially overwritten by the second track; and
leaving a portion of the second track blank corresponding to the area of the first track storing the first and the second servo correction data.

* * * * *